United States Patent [19]
Nishii

[11] Patent Number: 5,029,951
[45] Date of Patent: Jul. 9, 1991

[54] HYDRAULIC BRAKING SYSTEM FOR AN AUTOMOTIVE VEHICLE

[75] Inventor: Michiharu Nishii, Toyota, Japan

[73] Assignee: Aisin Seiki Kabushiki Kaisha, Kariya, Japan

[21] Appl. No.: 413,241

[22] Filed: Sep. 27, 1989

[30] Foreign Application Priority Data

Sep. 30, 1988 [JP] Japan .................. 63-24897

[51] Int. Cl.⁵ .................. B60T 8/44; B60T 15/06
[52] U.S. Cl. .................. 303/114; 303/50
[58] Field of Search .................. 303/50, 114

[56] References Cited

U.S. PATENT DOCUMENTS

| | | | |
|---|---|---|---|
| 4,050,748 | 9/1977 | Belart | 303/114 |
| 4,641,895 | 2/1987 | Belart et al. | 303/114 X |
| 4,720,151 | 1/1988 | Belart et al. | 303/114 X |
| 4,729,610 | 3/1988 | Seibert et al. | 303/114 |
| 4,732,429 | 3/1988 | Belart et al. | 303/114 |
| 4,743,073 | 5/1988 | Gruenberg | 303/114 X |
| 4,761,042 | 8/1988 | Seibert et al. | 303/114 X |
| 4,772,075 | 9/1988 | Wupper et al. | 303/114 |

FOREIGN PATENT DOCUMENTS

| | | |
|---|---|---|
| 3541833 | 6/1987 | Fed. Rep. of Germany ...... 303/114 |
| 3636442 | 5/1988 | Fed. Rep. of Germany ...... 303/114 |
| 209948 | 4/1984 | Japan . |
| 59-227552 | 12/1984 | Japan . |
| 62-149547 | 7/1987 | Japan . |
| 2138085 | 10/1984 | United Kingdom ................ 303/114 |
| 2186931 | 8/1987 | United Kingdom ................ 303/114 |

Primary Examiner—Douglas C. Butler
Assistant Examiner—Alfred Muratori
Attorney, Agent, or Firm—Burns, Doane, Swecker & Mathis

[57] ABSTRACT

A hydraulic braking system for an automotive vehicle having a power source for generating a hydraulic power pressure, a reservoir, a master cylinder having a master piston, a hydraulic booster for actuating the master cylinder in response to depression of a brake pedal and a plurality of wheel brake cylinders connected to the master cylinder for braking respective road wheels. The hydraulic booster is provided with a power piston which is larger in diameter than the master piston. The power piston transmits a force to the master piston through a closed chamber which is defined between the power piston and the master piston, when the hydraulic power pressure is supplied to the hydraulic booster in response to depression of the brake pedal. The closed chamber is filled with a brake fluid which is supplied from the reservoir. Thus, a small stroke of the power piston will suffice for operating the master piston at a predetermined stroke, so that the stroke of the brake pedal is reduced. Also, a braking force is ensured with the power piston mechanically connected to the master piston, when the hydraulic booster, for example, does not operate.

14 Claims, 2 Drawing Sheets

HYDRAULIC BRAKING SYSTEM FOR AN AUTOMOTIVE VEHICLE

BACKGROUND OF THE INVENTION

1. Field of the Invention

The present invention relates to a hydraulic braking system for use in an automotive vehicle, and more particularly to a hydraulic braking system which comprises a hydraulic booster for actuating a master cylinder in response to operation of a brake pedal with a hydraulic power pressure supplied from a power source.

2. Description of the Prior Art

In conventional service braking systems for an automotive vehicle, there are provided a plurality of hydraulic circuits connecting wheel brake cylinders mounted on road wheels with a hydraulic braking pressure generator such as a master cylinder, so that when one of the hydraulic circuits is broken, braking operation is performed by the rest of the hydraulic circuits. In general, a tandem master cylinder is used in a conventional dual circuits system.

In order to reduce a depressing force applied on a brake pedal in braking operation, the hydraulic braking system is provided with a servo unit which is referred as a servo or a booster and which utilizes compressed air, intake manifold vacuum (for a vacuum booster), or hydraulic pressure (for a hydraulic booster) as a power source. The hydraulic booster is a booster which actuates the hydraulic braking pressure generator such as the master cylinder by the hydraulic power pressure supplied from the power source in response to depression of the brake pedal. In Japanese Patent Laid-open Publication No. 59-209948, for example, disclosed is a hydraulic braking system in which the hydraulic booster is associated with a tandem master cylinder and which operates as a conventional tandem master cylinder when the hydraulic booster does not operate.

Further, It has been proposed that a hydraulic pressure generated by the hydraulic booster in response to depression of the brake pedal is applied directly to one of the hydraulic circuits. For example, as shown in Japanese Patent Laid-open Publication No. 59-227552, the hydraulic pressure generated by the hydraulic booster is applied to rear wheel brake cylinders in a front-rear dual circuits system in order to reduce the stroke of the brake pedal.

As for the above-described conventional hydraulic braking system, in the case where the hydraulic booster becomes insufficient to fulfill its boost function, or the case where the hydraulic power pressure disappears due to stoppage of the power source or other defects so that the hydraulic booster becomes incapable of obtaining any boost function, the braking force on the front road wheels is ensured by the master cylinder, but a large depressing force shall be applied on the brake pedal in order to obtain the necessary braking force.

In the Japanese Patent Laid-open Publication No. 62-149547, there is disclosed a system, in which a booster or an auxiliary cylinder is arranged in parallel with a hydraulic braking pressure generator and a control valve is provided for applying to wheel brake cylinders a hydraulic braking pressure from a master cylinder increased by the auxiliary cylinder when a hydraulic pressure generated in a hydraulic pressure chamber of a hydraulic booster or a power source is less than that in the master cylinder by a predetermined value or above, while applying the hydraulic braking pressure from the master cylinder to the wheel brake cylinders without increasing the hydraulic braking pressure in the case other than the above. Thereby, even if the boost function of the hydraulic booster cannot be obtained, the hydraulic braking pressure from the master cylinder is increased by the auxiliary cylinder to be applied to the wheel brake cylinders, so that a large depressing force does not have to be applied on the brake pedal.

However, in the above described hydraulic braking system, there must be provided an auxiliary cylinder or the like in order to ensure a braking force when a source for reducing the stroke of the brake pedal, such as the hydraulic booster does not operate. As for the auxiliary cylinder, various embodiments thereof are disclosed in the above publication. However, any of those auxiliary cylinders must be incorporated into the conventional hydraulic braking system having the tandem master cylinder and the hydraulic booster for example, integrally or separately, so that the braking system as a whole tends to be expensive, large and heavy.

SUMMARY OF THE INVENTION

It is, therefore, an object of the present invention to provide a hydraulic braking system for an automotive vehicle having a hydraulic booster and a master cylinder, which reduces a stroke of a brake pedal and which ensures a braking force when a source for reducing the stroke does not operate.

It is another object of the present invention to provide a hydraulic braking system for an automotive vehicle which reduces the stroke of the brake pedal, and which is relatively small in size, light in weight and economical to manufacture.

In accomplishing these and other objects, a hydraulic braking system for an automotive vehicle according to the present invention comprises a power source for generating a hydraulic power pressure, a reservoir for storing an amount of brake fluid, a master cylinder which has a housing defining therein a first bore and a master piston slidably disposed in the first bore, and which introduces the brake fluid into the first bore from the reservoir and generates a hydraulic braking pressure in response to depression of a brake pedal, and a hydraulic booster which has a housing defining therein a boost chamber and a second bore communicated therewith and aligned coaxially with the first bore. The hydraulic booster has a power piston which is slidably disposed in the second bore and actuates the master piston with the hydraulic power pressure supplied into the boost chamber from the power source in response to depression of the brake pedal. The power piston is larger in diameter than the master piston and transmits a force to the master piston through a closed chamber which is defined between the power piston and the master piston, and which is filled with the brake fluid supplied from the reservoir. The hydraulic braking system further comprises a plurality of wheel brake cylinders which is connected to the master cylinder and brakes respective road wheels.

The above-described hydraulic braking system may further comprise first one-way valve means which is connected to the closed chamber and which permits the flow of the brake fluid from the reservoir to the closed chamber in response to a difference in hydraulic pressure therebetween.

The above-described braking system may further comprise second one-way valve means which is connected to the closed chamber and which permits the flow of the brake fluid from the closed chamber to the boost chamber in response to a difference in hydraulic pressure therebetween.

In the above-described braking system, one end of the master piston may be slidably disposed in the first bore and the other end of the master piston is received in the second bore which is divided into the closed chamber and a fluid chamber communicating with the reservoir by a first annular cup seal which is disposed in the second bore for encircling a periphery of the master piston. The first annular cup seal permits the flow of the brake fluid from the fluid chamber to the closed chamber in response to a difference in hydraulic pressure therebetween and blocks the counterflow thereof. Also, a second annular cup seal may be disposed in the second bore for encircling the power piston. The second annular cup seal permits the flow of the brake fluid from the closed chamber to the boost chamber in response to a difference in hydraulic pressure therebetween and blocks the counterflow thereof. A spring is disposed between the power piston and the master piston, and the spring biases the pistons away from each other.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENTS

Figure 1:
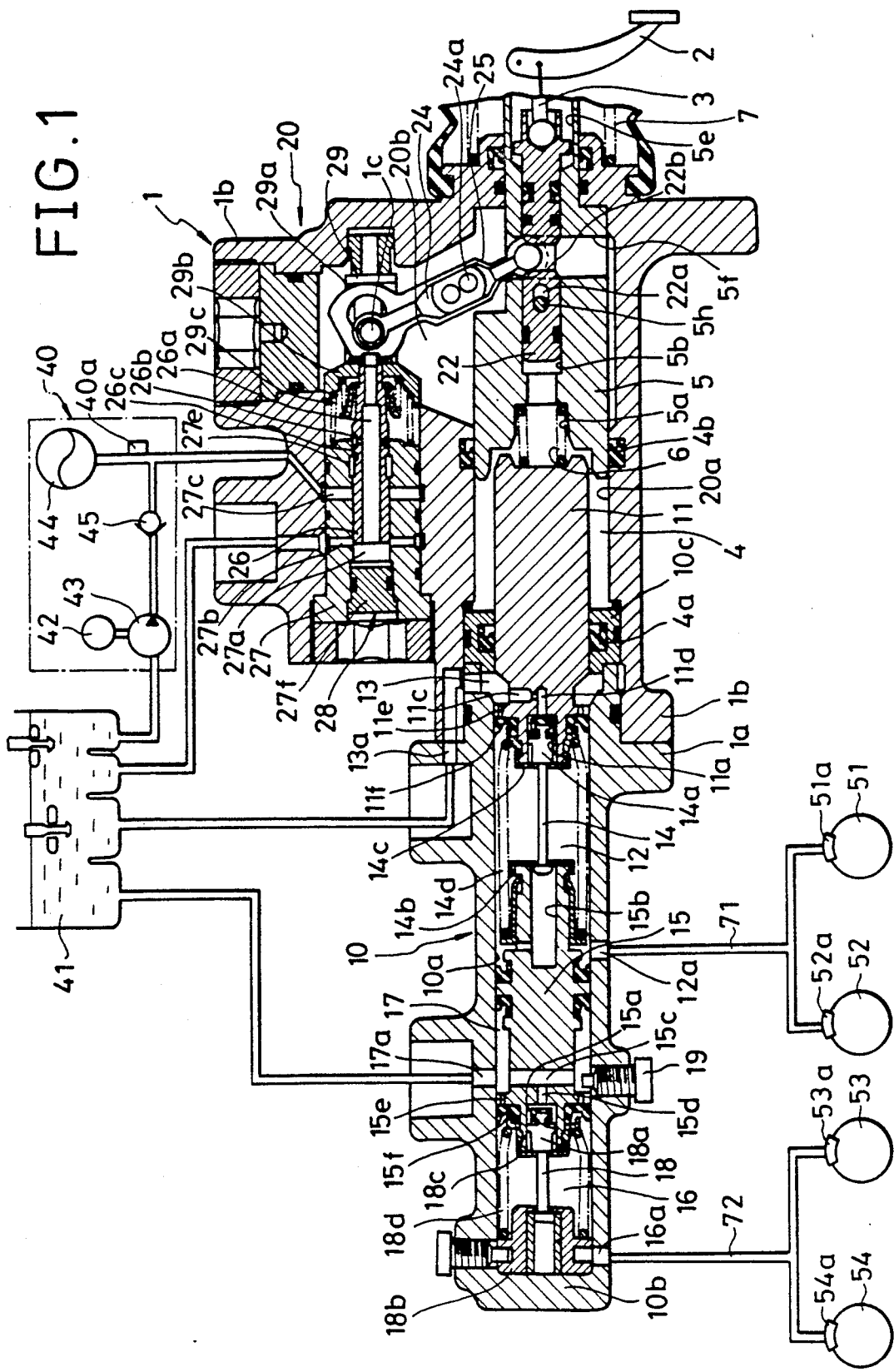
FIG. 1 is a schematic illustration of a hydraulic braking system of a first embodiment of the present invention with a sectional view of a hydraulic pressure generator.

Referring to FIG. 1, there is illustrated a hydraulic braking system of an embodiment of the present invention, which includes a hydraulic pressure generator (hereinafter referred to simply as a pressure generator) 1 having a tandem master cylinder 10 and a hydraulic booster 20. A power source 40 and a reservoir 41 are connected to the pressure generator 1. A depressing force applied on a brake pedal 2 is transmitted as a braking force to the pressure generator 1. In response to this braking force, a hydraulic pressure is generated by the pressure generator 1 and applied to wheel brake cylinders 51a to 54a mounted on front road wheels 51, 52 and rear road wheels 53, 54, through a first hydraulic circuit 71 and a second hydraulic circuit 72 respectively.

A housing of the pressure generator 1 comprises a housing 1a having a cylinder bore 10a formed therein and a housing 1b having a cylinder bore 20a formed therein. Both cylinder bores 10a, 20a are joined together coaxially and communicated with each other. The cylinder bore 20a is larger in diameter than the cylinder bore 10a and has a stepped bore formed in the vicinity of a joint where both cylinder bores 10a, 20a are joined together. The stepped bore has a large-diameter portion, into which an annular member 10c is fitted. The annular member 10c is held between the stepped portion of the cylinder bore 20a and an open end portion of the housing 1a. The inner diameter of the annular member 10c is substantially equal with that of the cylinder bore 10a. The annular member 10c has an inner surface formed with an annular recess, in which a cup seal 4a is received. Further, the cylinder bore 20a has an inner surface formed with an annular recess, in which a cup seal 4b is received.

A tandem master cylinder 10 is provided with a first piston 11 and a second piston 15. The first piston 11 has a cylindrical body portion which is fitted into the annular member 10c, and a land portion which is formed on one end of the first piston 11 and which is fluid-tightly and slidably received in the cylinder bore 10a. The second piston 15 is disposed adjacent to the first piston 11 and fluid-tightly and slidably received in the cylinder bore 10a.

The cup seal 4a is interposed between the annular member 10c and the body portion of the first piston 11 thereby to hold the first piston 11 fluid-tightly and slidably. Further, a first fluid chamber 13 is defined between the annular member 10c having the cup seal 4a and the land portion of the first piston 11. The first fluid chamber 13 communicates with a reservoir 41 through a port 13a. Further, in the cylinder bore 10a, a first pressure chamber 12 is defined between the land portion of the first piston 11 and the second piston 15. The first pressure chamber 12 communicates with a first hydraulic circuit 71 through a port 12a.

The first piston 11 has a hole 11a extending axially from its one end toward its center and a hole 11c formed radially. Both holes 11a, 11c communicate with each other through a hole 11d formed axially in the first piston 11. Further, a hole 11e is formed axially in a peripheral edge portion of the first piston 11, and covered with a cup seal 11f at its end open to the first pressure chamber 12, whereby a check valve is formed. A valve member 14a mounted on one end of a valve rod 14 is slidably received in the hole 11a of the first piston 11 so as to face with the hole 11d. The valve member 14 is restricted from moving toward the second piston 15 by a retainer 14c. A large-diameter portion formed on the other end of the valve rod 14 is slidably received in a hole 15b formed in the second piston 15, and restricted from moving toward the first piston 11 by a retainer 14b. A return spring 14d is mounted between the retainers 14b, 14c so as to bias the first piston 11 away from the second piston 15, so that the opposite ends of the valve rod 14 are engaged with the retainers 14b, 14c in the normal state.

Accordingly, the valve member 14a is positioned away from the hole 11d, and a brake fluid supplied from the reservoir 41 to the first fluid chamber 13 through the port 13a is then supplied to the first pressure chamber 12 through the hole 11e, and also through the hole 11c, the hole 11d and the hole 11a of the first piston 11 to be filled within the first pressure chamber 12. As a result, when the first piston 11 is pressed toward the second piston 15 to be moved against the biasing force of the return spring 14d, the hole 11e is closed by the cup seal 11f, and the hole 11d is closed by the valve member 14a, so that the first pressure chamber 12 is held in the closed state except the port 12a thereby to increase the pressure of the brake fluid in the first pressure chamber 12 in response to the sliding motion of the first piston 11.

The second piston 15 is disposed between the closed end 10b of the cylinder bore 10a and the first piston 11, and fluid-tightly and slidably received in the cylinder bore 10a. The second piston 15 has opposite ends formed with a land portion of the same diameter respectively. A second fluid chamber 17 is defined between both land portions of the second piston 15, and a second pressure chamber 16 is defined between the second piston 15 and the closed end 10b of the cylinder bore 10a. The second pressure chamber 16 communicates with a second hydraulic circuit 72 through a port 16a, and the second fluid chamber 17 communicates with the reservoir 41 through a port 17a.

The second piston 15 has a pair of holes 15a, 15b formed axially and a hole 15c formed radially. Both holes 15a, 15c communicate with each other through a hole 15d formed axially in the second piston 15. Further, a hole 15e is formed axially in a peripheral edge portion of the second piston 15, and covered with a cup seal 15f at its end open to the second pressure chamber 16. A valve member 18a mounted on one end of a valve rod 18 is slidably received in the hole 15a of the second piston 15 so as to face with the hole 15d, and restricted from moving toward the closed end 10b by a retainer 18c. A large-diameter portion formed on the other end of the valve rod 18 is slidably received in a retainer 18b, and restricted from moving toward the second piston 15. A return spring 18d is mounted between the retainers 18b, 18c, so that the second piston 15 is biased to be away from the closed end 10b, while the second piston 15 is restricted from moving toward the first piston 11 by a bolt 19. Accordingly, in the normal state, the valve member 18a is positioned away from the hole 15d, and the brake fluid is supplied from the reservoir 41 to the second fluid chamber 17 and the second pressure chamber 16 through the port 17a to be filled within the chambers.

Accordingly, when the first piston 11 slides toward the second piston 15, the first pressure chamber 12 is contracted to increase the pressure of the brake fluid in the first pressure chamber 12, while the second piston 15 slides against the biasing force of the return spring 18d, whereby the hole 15d is closed by the valve member 18a to increase the pressure of the brake fluid in the second pressure chamber 16.

In the housing 1b joined with the housing 1a, a boost chamber 20b of the hydraulic booster 10 is defined. The boost chamber 20b communicates with the cylinder bore 20a. A power piston 5 is fluid-tightly and slidably received in the cylinder bore 20a with the cup seal 4b disposed therebetween. The power piston 5 has a recess 5a which is formed at its end facing the first piston 11, a bore 5b which is formed axially in the center and communicates with the recess 5a, and a bore 5e which is larger in diameter than the bore 5b. A reaction piston 22 is fluid-tightly and slidably received in the bore 5b.

Accordingly, a closed chamber 4 is defined around the body portion of the first piston 11 located between the cup seal 4b, into which the power piston 5 is fitted, and the cup seal 4a, into which the first piston 11 is fitted. As shown in FIG. 1, a lip portion of each of the cup seals 4a, 4b has the tip directed toward the boost chamber 20b. Namely, the cup seal 4a constitutes one-way valve means for permitting the flow of the brake fluid from the first fluid chamber 13 to the closed chamber 4, while blocking the flow of the brake fluid from the closed chamber 4 to the first fluid chamber 13, in accordance with a difference in hydraulic pressure between the first fluid chamber 13 and the closed chamber 4. Further, the cup seal 4b constitutes one-way valve means for permitting the flow of the brake fluid from the closed chamber 4 to the boost chamber 20b, while blocking the flow of the brake fluid from the boost chamber 20b to the closed chamber 4, in accordance with a difference in hydraulic pressure between the closed chamber 4 and the boost chamber 20b. The power piston 5 which is fitted into the cylinder bore 20a is larger in diameter than the first piston 11 which is fitted into the cylinder bore 10a, so that the pressure-applied area of the power piston in the closed chamber 4 is larger than that of the first piston 11.

In the hydraulic booster 20, the power piston 5 is provided with a retainer (not shown) at its end extending toward the brake pedal 2, and normally biased toward the brake pedal 2 by a spring 7 mounted between the retainer and the housing 1b. The power piston 5 has in the middle thereof a shoulder portion which abuts on the housing 1b to restrict the power piston 5 from sliding toward the brake pedal 2. In the recess 5a formed on the power piston 5 at its end facing the first piston 11, a spring 6 is disposed with one end thereof seated on the bottom of the recess 5a, while the other end of the spring 6 is seated on a recess formed on one end surface of the first piston 11, so that the power piston 5 and the first piston 11 are biased away from each other.

In the reaction piston 22, there is formed an elongated hole 22a extending coaxially with the axis of the reaction piston 22, and a through-hole 22b extending perpendicularly to the elongated hole 22a. A pin 5h which is fixed to the power piston 5 is disposed in the elongated hole 22a, so that the reaction piston 22 is restricted from sliding at least toward the brake pedal 2 with respect to the power piston 5. One end of an input rod 3 is connected to the brake pedal 2, and the other end of the input rod 3 is provided with a spherical head which is inserted in the bore 5e of the power piston 5 and received in a recess formed at an end portion of the reaction piston 22, and which is engaged with the projection formed on the inner surface of the recess. In the power piston 5, there is formed radially a through-hole 5f which is aligned with the through-hole 22b when the reaction piston 22 is positioned most closely to the brake pedal 2 and which is larger in diameter than the through-hole 22b.

A support lever 24 is pivotally connected at its one end to the housing 1b by a pin 1c for pivotal movement within the boost chamber 20b, and a spherical head of the support lever 24 is fitted into the through-hole 22b of the reaction piston 22. And, one head of a control lever 25, which is pivotally connected to the support lever 24 by a pin 24a, is fitted into the through-hole 5f of the power piston 5. In the other head of the control lever 25, there is defined a hole around the pin 1c. Accordingly, when the reaction piston 22 slides toward the output rod 14 with respect to the power piston 5 which is urged toward the brake pedal 2, a rotating force is exerted on the support lever 24 so as to pivotally move the support lever 24 clockwise about the pin 1c. At that time, since one head of the control lever 25 is retained in the through-hole 5f of the power piston 5, the other head of the control lever 25 is rotated counterclockwise about the pin 24a and hence moved in the sliding direction of the reaction piston 22. As a result, the other head of the control lever 25 is displaced in response to movement of the reaction piston 22 until it comes into contact with the bottom of the bore 5b.

The housing 1b has a spool-valve bore extending substantially in parallel with the power piston 5 and communicating with the boost chamber 20b, and a spool valve 28 is fitted into the spool-valve bore. The spool valve 28 has a spool 26 which is slidably received in a spool bore 27a formed in a cylinder 27 substantially in parallel with the power piston 5. One end of the spool bore 27a is fluid-tightly plugged by a closure member 27f. In the spool 26, there is formed axially a hole 26a, and formed radially a hole 26b communicating with the hole 26a. One end of the spool 26 is positioned in the boost chamber 20b and connected to one end of a control rod 29. The other end of the control rod 29 is slidably mounted on a recess formed in the housing 1b, and the head of the control lever 25 is fitted into a through-hole 29a radially bored in the control rod 29. Between the cylinder 27 and a retainer 29b supported at one end of the control rod 29, a spring 29c is mounted so as to normally bias the spool 26 toward the pin 1c. The hole 26a normally opens to the boost chamber 20b at the junction of the spool 26 and the control rod 29. When the control lever 25 is in its initial position, the hole 26a of the spool 26 communicates with the reservoir 41 through a hole 27b radially bored in the cylinder 27. Thus, the boost chamber 20b also communicates with the reservoir 41 and is filled with the brake fluid under the atmospheric pressure.

A hole 27c communicating with the power source 40 is formed in the cylinder 27 with a predetermined distance from the hole 27b toward the control rod 29. The hole 27c is normally closed by the peripheral surface of the spool 26. Between the hole 27c and the one end of the spool 26 facing the control rod 29, an annular groove 27e is formed on the inner surface of the cylinder 27, and an annular groove 26c is formed on the peripheral outer surface of the spool 26 in opposing relation to the annular groove 27e. When the spool 26 is moved toward the closure member 27f in response to movement of the control lever 25, the hole 27b of the cylinder 27 is closed. The hole 27c in turn faces the annular groove 26c of the spool 26, and the annular groove 27e faces the hole 26b. Consequently, the hole 27c communicates with the hole 26a.

Accordingly, the hydraulic power pressure of the power source 40 is introduced into the boost chamber 20b to increase the hydraulic pressure therein, so that the reaction force is thereby transmitted to the brake pedal 2 through the reaction piston 22, and simultaneously the increased hydraulic pressure is applied to the power piston 5, so that the power piston 5 is forced to move toward the first piston 11. The power piston 5 moves until the pin 5h comes into contact with an end portion of the elongated hole 22a at maximum with respect to the reaction piston 22. Thereby, the relative position of the control lever 25 and the support lever 24 becomes that in its initial state. Accordingly, the control lever 25 is moved clockwise to retract the control rod 29 toward the brake pedal 2. Thereby, the hole 27c of the cylinder 27 is closed, and in turn the hole 27b communicates with the hole 26a, of the spool 26 to lower the hydraulic pressure in the boost chamber 20b so that the power piston 5 is moved toward the brake pedal 2. With this operation performed repeatedly, the hydraulic power pressure within the boost chamber 20b is regulated so as to boost the master cylinder 10.

The first pressure chamber 12 of the tandem master cylinder 10 communicates with one circuit of the dual circuits, that is, it communicates with the wheel brake cylinders 51a, 52a of the front road wheels 51, 52 through the first hydraulic circuit 71 in the present embodiment, while the second pressure chamber 16 of the tandem master cylinder 10 communicates with the other circuit, that is, it communicates with the wheel brake cylinders 53a, 54a of the rear road wheels 53, 54 through the second hydraulic circuit 72. The above-described dual circuits may be arranged reversely in the front and rear road wheels, or may be arranged in so-called diagonal circuit system.

The power source 40 comprises a fluid pump 43 driven by an electric motor 42 and is so structured that its input side is connected to the reservoir 41 while its output side is connected t an accumulator 44 via a check valve 45, and the hydraulic power pressure is supplied to necessary portions via the accumulator 44. Further, the electric motor 42 is intermittently controlled by a controller (not shown) in response to a signal of a pressure sensor 40a, so that the hydraulic power pressure is maintained to be at a predetermined value.

The operation of the above described embodiment will now be explained. In the case where the brake pedal 2 is not depressed as shown in FIG. 1, the first pressure chamber 12 and the first fluid chamber 13 of the tandem master cylinder 10 communicate with each other, and communicate with the wheel brake cylinders 51a, 52a of the front road wheels 51, 52 and the reservoir 41 respectively, so that the brake fluid filled in each of these chambers is under a pressure equal to the pressure in the reservoir 41, that is, substantially under the atmospheric pressure. Further, the spring 6 is expanded, and the closed chamber 4 is filled with the brake fluid. Accordingly, the power piston 5 is fluidly connected to the first piston 11 through the brake fluid filled in the closed chamber 4.

On the other hand, when the power source 40 is actuated, the hydraulic power pressure is supplied to the hole 27c of the hydraulic booster 20, whereas the hydraulic booster 20 does not operate since the hole 27c is closed. The brake fluid filled in each of the second pressure chamber 16 and the second fluid chamber 17 communicates with the reservoir 41 through the port 17a, and it is substantially under the atmospheric pressure, so that the wheel brake cylinders 53a, 54a communicating with the second pressure chamber 16 through the port 16a and the second hydraulic circuit 72 are also under the atmospheric pressure.

In the case where the depressing force is applied on the brake pedal 2, the reaction piston 22 is pushed with the input rod 3. And, when the reaction piston 2 is moved until it comes into contact with the bottom of the bore 5b of the power piston 5, the control lever 25 is rotated counterclockwise with respect to the support lever 24, so that the head of the control lever 25 pushes the spool 26. Thereby, the hydraulic power pressure is introduced from the power source 40 into the boost chamber 20b, so that the boost force is applied to the first piston 11 with the power piston 5, and the reaction force is transmitted to the brake pedal 2 with the reaction piston 22.

When the first piston 11 starts to slide with the power piston 5, the hole 11d is closed by the valve member 14a, and the hydraulic braking pressure is supplied to the wheel brake cylinders 51a, 52a in response to the contraction of the first pressure chamber 12. At the same time, the second piston 15 slides, and the hydraulic braking pressure is supplied to the wheel brake cylinders 53a, 54a in response to the contraction of the second pressure chamber 16.

In the above-described braking operation, since the hydraulic pressure in the closed chamber 4 is less than that in the boost chamber 20b, and higher than that in the first fluid chamber 13, the closed chamber 4 maintains the quantity of the brake fluid filled therein under the condition that the spring 6 is expanded, that is, under the condition that the power piston 5 is away from the first piston 11. Thus, the boost force is transmitted from the power piston 5 to the first piston 11 through the fluid, or the brake fluid filled in the closed chamber 4. Since the power piston 5 is larger in diameter than the first piston 11 and has the pressure applied area larger than that of the first piston 11, the stroke of the first piston 11 comes to be larger than that of the power piston 5 in inverse proportion to the ratio of the pressure applied area of the power piston 5 to that of the first piston 11. In other words, a small stroke will suffice for the stroke of the power piston 5 necessary for operating the first piston 11 at the predetermined stroke, that is, the stroke of the brake pedal 2. Accordingly, in the above described braking operation, the stroke of the brake pedal 2 is reduced, comparing with that of the prior art system.

In the case where the hydraulic power pressure disappears due to some defects of the power source 40, or the hydraulic pressure in the boost chamber 20b becomes less than that in the closed chamber 4 due to some defects of the hydraulic booster 20 itself for example, when the power piston 5 is moved by depressing the brake pedal 2, the brake fluid in the closed chamber 4 flows into the boost chamber 20b. Thereby, the end surface of the power piston 5 comes into contact with the end surface of the first piston 11 against the biasing force of spring 6, so that the power piston 5 is mechanically connected to the first piston 11. Thus, a sufficient braking force is ensured even if the boost force of the hydraulic booster 20 disappears.

When the brake pedal 2 is released, the hydraulic pressure in the closed chamber 4 is decreased, and the brake fluid is supplied from the first fluid chamber 13 to the closed chamber 4 due to a difference in hydraulic pressure between the first fluid chamber 13 and the closed chamber 4, so that the brake fluid is filled in the closed chamber 4. Consequently, soon after the boost force of the hydraulic booster 20 becomes sufficient and the boost function is recovered, the function of reducing the stroke is obtained.

As described above, according to the present embodiment, the stroke of the brake pedal 2 may be reduced with a simple structure made within the range of design of the existing hydraulic braking system, or with the prior hydraulic braking system modified in such a manner that the first piston 11 is axially extended and the closed chamber 4 is defined by the cup seals 4a, 4b different from each other in diameter. In addition, when the boost force of the hydraulic booster 20 disappears, the tandem master cylinder 10 is mechanically operated by the brake pedal 2 to ensure the braking force.

Figure 2:
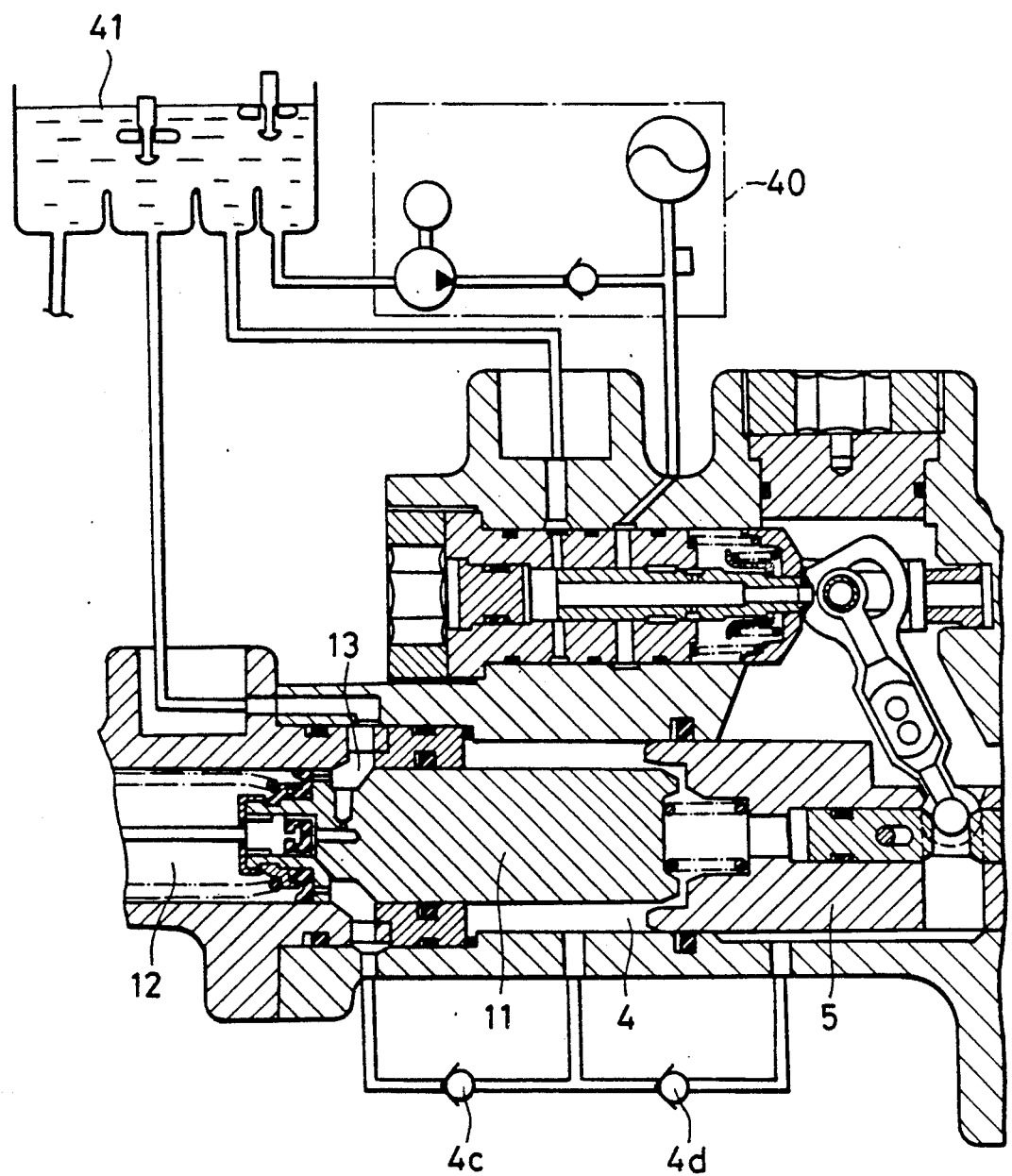
FIG. 2 is a schematic illustration of a hydraulic braking system of a second embodiment of the present invention with a sectional view of a part of a hydraulic pressure generator.

FIG. 2 shows a part of the hydraulic braking system according to another embodiment of the present invention. The remaining structure of this embodiment is substantially same as that shown in FIG. 1. In this embodiment, check valves 4c, 4d are additionally provided for one-way valve means, in lieu of the cup seals 4a, 4b shown in FIG. 1. Therefore, seal members contacted with the power piston 5 and the first piston 11 for defining the closed chamber 4 are not required to have the one-way valve function, so that the seal members may be selected on the basis of only sealing performance. Further, the check valves 4a, 4b may be of a small-sized type, so that they may be easily disposed in a surplus space.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A hydraulic braking system for an automotive vehicle comprising:

a power source for generating a hydraulic power pressure;

a reservoir for storing an amount of brake fluid;

a master cylinder having a housing defining therein a first bore and a master piston slidably disposed in said first bore for introducing said brake fluid into said first bore from said reservoir and generating a hydraulic braking pressure in response to depression of a brake pedal;

a hydraulic booster having a housing defining therein a boost chamber and a second bore communicated therewith and aligned coaxially with said first bore, said hydraulic booster having a power piston slidably disposed in said second bore for actuating said master piston with said hydraulic power pressure supplied into said boost chamber from said power source in response to depression of said brake pedal, said power piston being larger in diameter than said master piston and transmitting a force to said master piston through a closed chamber defined between said power piston and said master piston, said closed chamber being filled with the brake fluid supplied from said reservoir and prevention means to prevent fluid from returning to said reservoir so as to transmit the force from said power piston to said master piston in a spaced relationship therebetween; and a plurality of wheel brake cylinders connected to said master cylinder for braking respective road wheels.

2. A hydraulic braking system for an automotive vehicle as set forth in claim 1, said prevention means further comprising first one-way valve means connected to said closed chamber for permitting the flow of the brake fluid from said reservoir to said closed chamber in response to a difference in hydraulic pressure therebetween.

3. A hydraulic braking system for an automotive vehicle as set forth in claim 2, wherein said first one-way valve means comprises a seal member disposed in said closed chamber for encircling a periphery of said master piston.

4. A hydraulic braking system for an automotive vehicle as set forth in claim 2, wherein said first one-way valve means comprises a check valve disposed in a hydraulic circuit communicating said closed chamber with said reservoir.

5. A hydraulic braking system for an automotive vehicle as set forth in claim 2, wherein one end of said master piston is slidably disposed in said first bore and the other end of said master piston is received in said second bore, and wherein said closed chamber is defined in said second bore between said master piston and said power piston.

6. A hydraulic braking system for an automotive vehicle as set forth in claim 5, wherein said first one-way valve means comprises an annular cup seal disposed in said second bore for encircling a periphery of said master piston.

7. A hydraulic braking system for an automotive vehicle as set forth in claim 2, further comprising second one-way valve means connected to said closed chamber for permitting the flow of the brake fluid from said closed chamber to said boost chamber in response to a difference in hydraulic pressure therebetween.

8. A hydraulic braking system for an automotive vehicle as set forth in claim 7, wherein said second one-way valve means comprises a seal member disposed in said closed chamber for encircling a periphery of said power piston.

9. A hydraulic braking system for an automotive vehicle as set forth in claim 7, wherein said second one-way valve means comprises a check valve disposed in a hydraulic circuit communicating said closed chamber with said boost chamber.

10. A hydraulic braking system for an automotive vehicle as set forth in claim 7, wherein one end of said master piston is slidably disposed in said first bore and the other end of said master piston is received in said second bore, and wherein said closed chamber is defined in said second bore between said master piston and said power piston.

11. A hydraulic braking system for an automotive vehicle as set forth in claim 10, wherein said second one-way valve means comprises an annular cup seal disposed in said second bore for encircling a periphery of said power piston.

12. A hydraulic braking system for an automotive vehicle as set forth in claim 11, wherein said first one-way valve means comprises an annular cup seal disposed in said second bore for encircling a periphery of said master piston.

13. A hydraulic braking system for an automotive vehicle as set forth in claim 9, wherein said first one-way valve means comprises a check valve disposed in a hydraulic circuit communicating said closed chamber with said reservoir.

14. A hydraulic braking system for an automotive vehicle as set forth in claim 1, wherein one end of said master piston is slidably disposed in said first bore and the other end of said master piston is received in said second bore, said second bore being divided into said closed chamber and a fluid chamber communicating with said reservoir by a first annular cup seal disposed in said second bore for encircling a periphery of said master piston, said first annular cup seal permitting the flow of the brake fluid from said fluid chamber to said closed chamber in response to a difference in hydraulic pressure therebetween and blocking the counterflow thereof, wherein a second annular cup seal is disposed in said second bore for encircling a periphery of said power piston, said second annular cup seal permitting the flow of the brake fluid from said closed chamber to said boost chamber in response to a difference in hydraulic pressure therebetween and blocking the counterflow thereof, and wherein a spring is disposed between said power piston and said master piston for biasing said pistons away from each other.

* * * * *